Patented Jan. 23, 1940

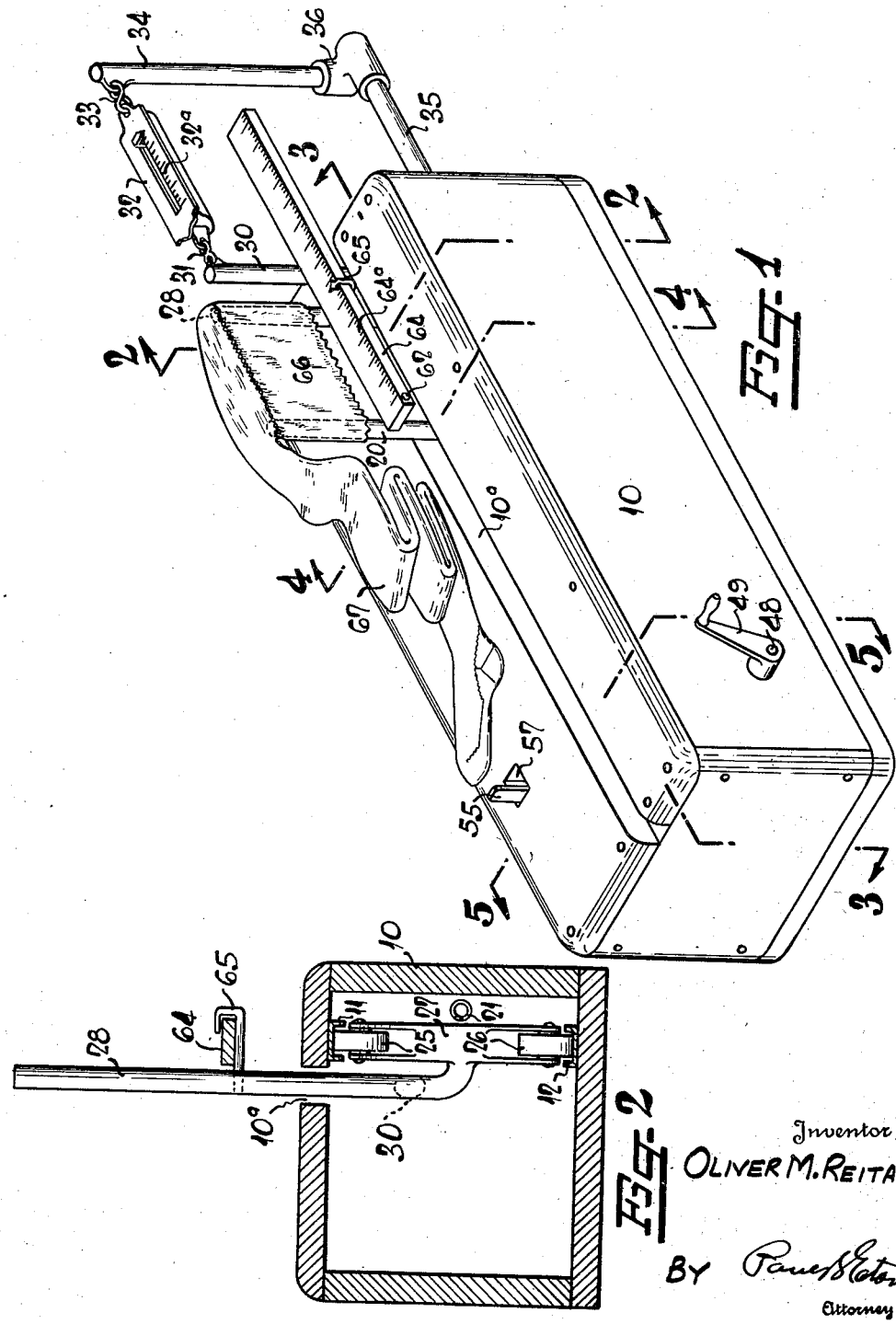

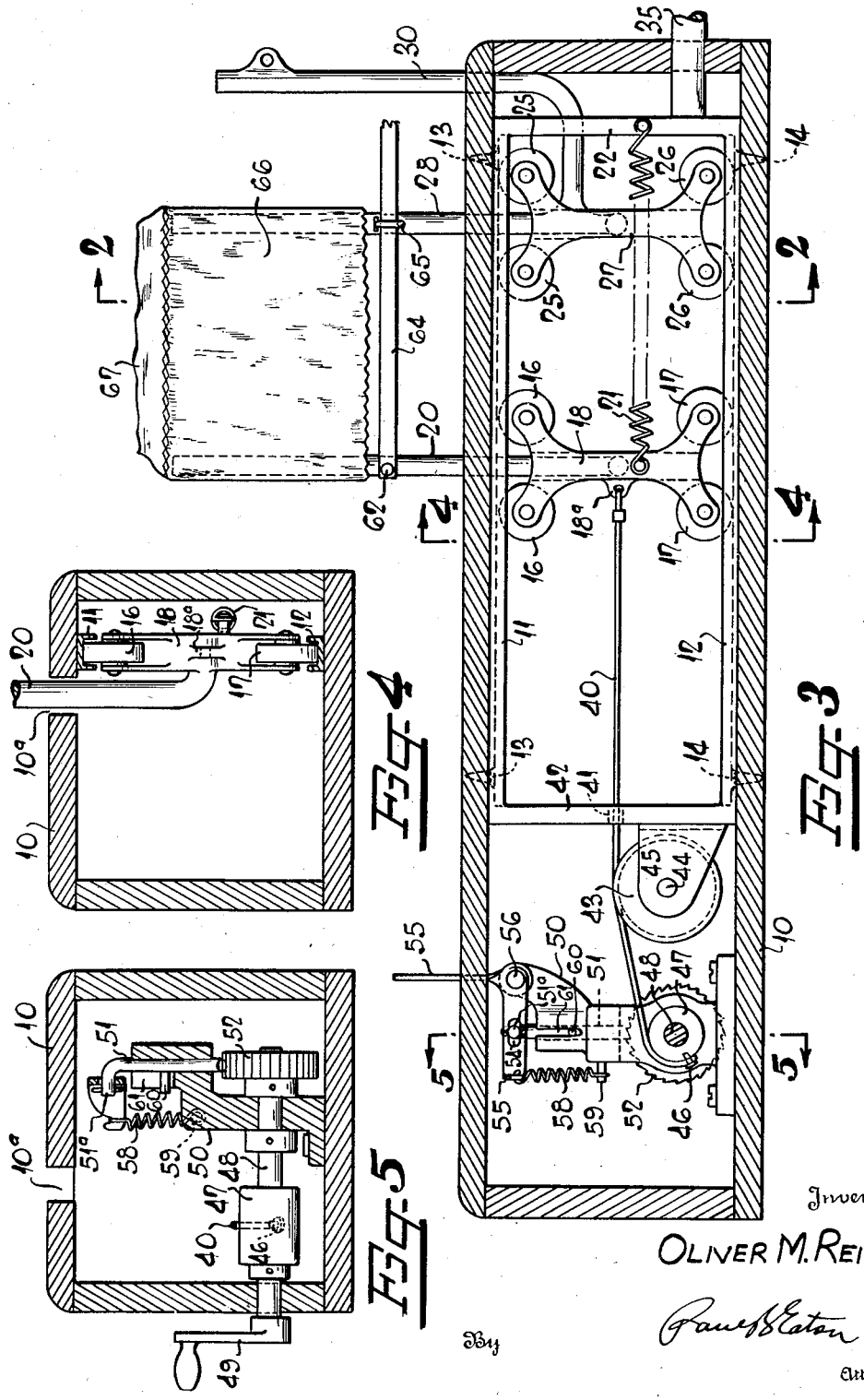

2,187,914

UNITED STATES PATENT OFFICE 2,187,914

HOSIERY TESTING APPARATUS

Oliver M. Reitan, Charlotte, N. C., assignor to Nebel Knitting Company, Charlotte, N. C., a corporation of North Carolina Application August 5, 1938, Serial No. 223,289

3 Claims. (Cl. 265—12)

This invention relates to an apparatus for testing the stretch in the welt of hosiery, so that a definite relation can be established between the amount of stretch and the pounds necessary to produce it. It is very desirable to have uniform stretch in full-fashioned hosiery so that the welt of each hose will bind uniformly upon the leg of the wearer. The present invention has means for making this test in a simple and effective manner, and so that the buyer or inspector may view the results of the test at every stage of the stretching operation.

It is, therefore, an object of this invention to provide an apparatus for testing the amount of stretch of hose welts, preferably within the elastic limits of the welt, said apparatus having means for simultaneously indicating the number of pounds necessary to produce the stretch. Although the present apparatus may be used to test the ultimate tensile strength of the welt of a hose, it is ordinarily not used for this purpose because such a test would destroy the welt.

Other objects of the invention are to provide a welt testing apparatus of the character described with comparatively simple construction, strong, durable, highly efficient, reliable in use, light in weight, and which may be manufactured at a low cost.

Some of the objects of the invention having been stated, other objects will appear as the description proceeds when taken in connection with the accompanying drawings, in which—

Figure 1 is an isometric view of the invention showing a full-fashioned hose in position for testing its welt;

Figure 2 is a transverse, sectional view taken along the line 2—2 in Figures 1 and 3;

Figure 3 is a longitudinal, vertical, sectional view taken along the line 3—3 in Figure 1;

Figure 4 is a transverse, vertical, sectional view taken along the line 4—4 in Figures 1 and 3;

Figure 5 is a transverse, sectional view taken along the lines 5—5 in Figures 1 and 3.

Referring more specifically to the drawings, the numeral 10 denotes a suitable casing in which upper and lower trackways 11 and 12 are secured by any suitable means such as screws 13 and 14, respectively. Rollers 16 and 17 are mounted on these track-ways, said rollers being rotatably confined in bracket 18. Integral with the bracket 18 and extending upwardly in parallel relation thereto is a post or standard 20, the upper end of which is adapted to receive the welt of a hose while being tested. A suitable tension spring 21 has one end thereof secured to the intermediate portion of bracket 18, and its other end secured to bar 22, which bridges the space between the ends of the upper and lower tracks 11 and 12. This spring normally tends to move the bracket 18 and its associated rollers 16 and 17 to the right in Figure 3.

A longitudinally disposed slot 10a is provided in the upper portion of casing 10 through which the standard 20 projects. This slot is disposed in parallel relation to the track-way 11 and therefore allows the standard 20 to move longitudinally of the casing.

Trackways 11 and 12 also have mounted therein rollers 25 and 26, said rollers being rotatably mounted in bracket 27. Extending from one side of the bracket 27 and in parallel relation thereto is another standard 28 which extends upwardly through slot 10a and is also adapted to receive the welt of a suitable hose which is to be tested. Extending from the standard 28 is an L-shaped member 30, and this member likewise projects upwardly through the slot 10a. A suitable eyelet is provided upon the upper end of the standard 30, which eyelet is penetrated by a link 31, which link has its other end secured to one end of scales 32. The other end of the scales has a link 33 secured thereto, said link 33 having its other end penetrating a suitable eyelet in the upper end of a stationary standard 34 which has its lower end connected to a horizontally disposed rod 35 by any suitable means such as a fitting 36. The rod 35 projects into the casing 10 and is secured to the stationary vertically disposed bar 22 (see Figure 3).

Bracket 18 has a suitable eyelet 18a near its central portion, in which is secured one end of a cable 40. The cable 40 extends to the left in Figure 3 and penetrates a suitable hole 41 in a vertically disposed strut 42, said strut 42 bridging the space between the upper and lower trackways 11 and 12. This cable passes over a pulley 43, which is rotatably mounted as at 44 in bracket 45 and the bracket is secured to vertically disposed strut 42.

The extreme left-hand end of the cable 40 is secured as at 46 to roller 47 which is fixedly secured on transversely disposed shaft 48. One end of the shaft 48 penetrates the side of casing 10 and has a suitable crank 49 secured thereon. The other end of shaft 48 is supported by bracket 50, said bracket extending upwardly and slidably supporting a vertically disposed dog 51. The lower end of this dog contacts teeth in a ratchet 52, which is fixedly secured on the end of shaft 48. The upper end of the dog 51 has a laterally disposed portion 51a which penetrates a slot 54 in bell crank 55. This bell crank is pivoted as at 66 to the upper portion of bracket 50. The vertical leg of the bracket extends upwardly through a suitable slot 57 in the top of casing 10. The end of the horizontal leg of the bell crank 55 has a tension spring 58 secured thereto, the lower end of said spring being secured as at 59 to the bracket 50. This spring normally forces the lower end of dog 51 into engagement with the periphery of ratchet 52. A pin 60 extends laterally from the dog 51 and is adapted to slide in slot 61, which is disposed in the upper portion of bracket 50. This pin normally holds the lower end of the dog in position so that the teeth will be properly engaged by the lower end of the dog, as the ratchet wheel 52 is turned by crank 49.

Pivoted as at 62 to the intermediate portion of standard 20 is one end of a rule 64. This rule has its intermediate portions supported by indicator 65, said indicator extending from the intermediate portion of post or standard 28 (Figures 1 and 2). It will be noted that this ruler has suitable graduations 64a thereon which indicate the amount of stretch produced in the stocking. The scales 32 have graduations 32a thereon which indicate the number of pounds necessary to produce a certain length of stretch.

Assume that welt 66 of a suitable hose 67 is inserted over the standards 20 and 28, as shown in Figure 1. The operator then proceeds to turn the crank 49 in a counter-clockwise manner in Figure 1, which will wind the cable 40 around the roller 47, and at the same time draw the bracket 18 and its associated post 20 to the left. As the bracket 18 moves to the left, a pull will likewise be exerted upon the upper end of the standard 28 through the welt 66 and this pull will be transmitted to the scales 32 through the post 30 and link 31. Since the extreme right-hand end of the scale 32 is stationary, it is evident that the amount of pull will be indicated upon graduations 32a. In the meantime, the right-hand end of the lever 64 will also move to the left along with the post 20, and since the post 20 is moving faster to the left than the post 28 it is evident that the difference in the amount of movement of the two posts, i. e., 20 and 28 will be the amount of stretch produced by applying a given load. In any event, the amount of the load applied to the welt of the stocking and the total amount of the stretch can be read at all times by observing the graduations 32a and 64a respectively.

As the crank 49 and shaft 48 are turned in a counter-clockwise manner (Figures 1 and 3), the dog 51 will hold the ratchet and its associated parts in position to which it has been turned. In other words, the handle 49 can be released and the posts 20 and 28 will remain in the position to which they have been drawn to allow the operator or buyer to read the amount of stretch and also the number of pounds pull exerted upon the welt to produce it. When it is desired to release the ratchet it is only necessary to rotate the bell crank 55 in a clockwise manner in Figure 3, which will allow the spring 21 to return bracket 18 and post 20 to normal position. In the meantime the pull of the scales 32 will return bracket 27 and standard 28 to normal position.

It is thus seen that I have provided a simple mechanism which is capable of testing the amount of stretch in the welt of a hose, and which is particularly adaptable for testing the welt of a hose within the elastic limits of the welt. It is also seen that I have provided an apparatus which is economical to manufacture, simple in construction and which may be manipulated with ease.

In the drawings and specification there has been set forth a preferred embodiment of the invention, and although specific terms are employed they are used in a generic and descriptive sense only, and not for the purposes of limitation, the scope of the invention being set forth in the appended claims.

I claim:

1. Apparatus for testing the welt of a stocking to determine the number of pounds pull necessary to stretch the welt a predetermined number of inches, comprising first and second movable members over which a welt of a stocking may be inserted in unstretched form, a fixed member, a weighing scale attached to the first movable member and to said fixed member, means attached to the second movable member for moving the same away from the first movable member, a measuring rule attached to the second movable member and slidably supported by the first movable member, whereby when the movable members are moved away from the fixed member and apart from each other, the weighing scale will indicate the number of pounds pull exerted on the welt and the measuring rule will indicate the amount of stretch imparted to the welt respectively.

2. Apparatus for testing the elasticity and stretch of welts of stockings comprising a casing, a pair of opposed trackways disposed within the casing, a pair of movable members having rollers thereon in engagement with proximate faces of the trackways, the casing having a slot extending longitudinally thereof, one of said members having a pair of standards projecting through said slot, and the other member having a single standard projecting through said slot, a fixed member having one side of a weighing scale attached thereto, means connecting the other side of said weighing scale to one of the standards on one of the movable members, a measuring rule having one end attached to the single standard and being slidably supported by the proximate one of the two standards projecting from the other movable member, a cord attached to the member having the single standard, a member mounted in the casing for rotation and having the other end of the cord attached thereto, ratchet means for holding the rotatable member in whatever position to which it may be rotated, the single standard and the proximate one of the pair of standards being adapted to have the welt of a stocking placed thereover so that when the rotatable member is rotated to a given position and held in such position, the scale will indicate the pounds of pull exerted on the welt and the measuring rule will indicate the number of inches of stretch imparted to the welt.

3. Apparatus for testing the elasticity and stretch of the welt of stockings, comprising a fixed member, a weighing scale attached to the fixed member, a first movable member attached to the other end of the weighing scale, a second movable member having a measuring rule attached thereto, means on the first movable member slidably supporting an intermediate portion of the measuring rule, tension means secured to a fixed part of the apparatus and to the second movable member and normally tending to move the second measuring means towards the first movable member, means for applying a pull to the second movable member, the two movable members having portions over which the welt of a stocking can be placed, and whereby when a pull is exerted on the second movable member to pull it away from the first movable member, the measuring rule will indicate the amount of stretch and the scale will indicate the number of pounds necessary to produce a given stretch in the welt of the stocking.

OLIVER M. REITAN.